United States Patent
Wang et al.

(10) Patent No.: US 11,307,643 B2
(45) Date of Patent: Apr. 19, 2022

(54) POWER MANAGEMENT SYSTEM AND POWER MANAGEMENT METHOD FOR COMPUTER SYSTEM

(71) Applicant: GIGA-BYTE TECHNOLOGY CO., LTD., New Taipei (TW)

(72) Inventors: Wei-Cheng Wang, New Taipei (TW); Chia-Neng Yang, New Taipei (TW); Chia-Cheng Chang, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 17/153,893

(22) Filed: Jan. 21, 2021

(65) Prior Publication Data
US 2021/0303059 A1    Sep. 30, 2021

(30) Foreign Application Priority Data
Mar. 31, 2020   (TW) ................................ 109111083

(51) Int. Cl.
*G06F 1/00*         (2006.01)
*G06F 1/3287*       (2019.01)
(Continued)

(52) U.S. Cl.
CPC ............ *G06F 1/3287* (2013.01); *G06F 1/263* (2013.01); *G06F 1/28* (2013.01)

(58) Field of Classification Search
CPC ... G06F 1/28; G06F 1/30; G06F 1/206; G06F 1/263; G06F 1/3209; G06F 1/3234; G06F 1/3278; G06F 1/3287; G06F 1/3296
See application file for complete search history.

(56) References Cited

U.S. PATENT DOCUMENTS

| | | | |
|---|---|---|---|
| 6,233,692 B1 | 5/2001 | Villanueva | |
| 6,594,771 B1 * | 7/2003 | Koerber | G06F 1/26 713/330 |

(Continued)

FOREIGN PATENT DOCUMENTS

| | | |
|---|---|---|
| CN | 107145098 A | 9/2017 |
| EP | 2393210 A1 | 12/2011 |

(Continued)

OTHER PUBLICATIONS

The extended European search report of corresponding European patent application No. 21152530.8 dated Jul. 1, 2021.

*Primary Examiner* — Nitin C Patel
(74) *Attorney, Agent, or Firm* — Idea Intellectual Limited; Margaret A. Burke; Sam T. Yip

(57) ABSTRACT

A power management system includes connection interfaces, a system power supply, and a power management circuit. Each connection interface is connected to one power consumption device. The system power supply includes power supply units (PSUs). The system power supply supplies electricity power to each power consumption device via one connection interface. The power management circuit is connected to each power consumption device via the connection interfaces. The power management circuit obtains a current total load of PSUs, determines a target load of each PSU, and determines whether each connection interface is connected to one power consumption device. The power management circuit turns off power supply to the connection interface that is not connected to the power consumption devices. According to the current total load and the target load, the power management circuit determines an enabled number of the PSUs, thereby turning on or turning off each PSU accordingly.

13 Claims, 11 Drawing Sheets

(51) Int. Cl.
*G06F 1/26* (2006.01)
*G06F 1/28* (2006.01)

(56) References Cited

U.S. PATENT DOCUMENTS

| | | |
|---|---|---|
| 7,024,567 B2 * | 4/2006 | Kim ................. G06F 1/266 |
| | | 713/300 |
| 7,715,215 B1 | 5/2010 | Bosco et al. |
| 8,872,379 B2 | 10/2014 | Ruiz et al. |
| 2004/0070275 A1 | 4/2004 | Niv |
| 2010/0306565 A1 | 12/2010 | Umedu |
| 2011/0126206 A1 * | 5/2011 | Kato ................. G06F 9/505 |
| | | 718/103 |
| 2011/0270458 A1 | 11/2011 | Liu |
| 2015/0044518 A1 | 2/2015 | Scheucher |
| 2015/0121113 A1 | 4/2015 | Ramamurthy et al. |
| 2016/0018874 A1 * | 1/2016 | Fang ............... H04W 52/0277 |
| | | 713/320 |
| 2019/0129481 A1 * | 5/2019 | Daly ................ G05D 23/1919 |

FOREIGN PATENT DOCUMENTS

| | | |
|---|---|---|
| RU | 2690750 C1 | 6/2019 |
| TW | M470448 U | 1/2014 |
| TW | 201500902 A | 1/2015 |
| TW | 201507318 A | 2/2015 |
| TW | 201712996 A | 4/2017 |

\* cited by examiner

POWER MANAGEMENT SYSTEM AND POWER MANAGEMENT METHOD FOR COMPUTER SYSTEM

CROSS-REFERENCE TO RELATED APPLICATION

This non-provisional application claims priority under 35 U.S.C. § 119(a) to Patent Application No. 109111083 filed in Taiwan, R.O.C. on Mar. 31, 2020, the entire contents of which are hereby incorporated by reference.

BACKGROUND

Technical Field

This disclosure relates to control of a plurality of power supply units, and in particular, to a power management system and a power management method.

Related Art

In a server or a high-speed computing system, a system power supply composed of more than two power supply units (PSUs) is usually used to meet requirements of power supply. However, in actual operation, the system does not continuously operate in a high load, but is completely or partially idle. In this case, each of the PSUs in the system power supply is in a low load state, failing to maintain loads of the PSUs at an optimal work efficiency point.

In addition, a slot on a motherboard, including but not limited to a central processing unit slot, a memory slot, a hard disk connection plug and a riser card thereof, and a PCI-E slot, is still supplied with power by the system power supply even in the idle state. Sometimes this power supply is unnecessary, and processes of power transmission, rectification and transformation also cause additional energy loss, forming unnecessary waste, and reducing actual work efficiency of the system power supply.

Therefore, how to effectively maintain work efficiency of each of the PSUs in the system power supply and save unnecessary power loss has become a significant technical issue.

SUMMARY

In view of the foregoing problems, this disclosure provides a power management system and a power management method, which can resolve a problem that work efficiency of a power supply unit cannot be optimized in the art.

This disclosure provides a power management system configured to supply electricity power to a plurality of power consumption devices. The power management system includes a plurality of connection interfaces, a system power supply, and a power management circuit.

The connection interfaces are configured to be respectively connected to one of the power consumption devices to perform signal transmission and power transmission. The system power supply includes a plurality of power supply units (PSUs). The system power supply is configured to supply electricity power to each of the connection interfaces, so as to supply electricity power to the power consumption devices through the connection interfaces. The power management circuit is connected to each of the power consumption devices via each of the connection interfaces.

The power management circuit obtains a current total load of the plural PSUs, determines a target load of each of the PSUs, and determines whether each of the connection interfaces is connected to one of the power consumption devices. The power management circuit turns off power supply to a connection interface that is not connected to one of the power consumption devices, and determines an enabled number of the PSUs according to the current total load and the target load of each of the PSUs, so that a current load of each of the PSUs to be turned on is close to the target load.

In at least one embodiment of this disclosure, the power management circuit determines, through presence or absence of a status signal returned by a designated pin in each of the connection interfaces, whether each of the connection interfaces is connected to one of the power consumption devices.

In at least one embodiment of this disclosure, the power management circuit detects, by using a detection circuit, whether each of the connection interfaces is connected to one of the power consumption devices. The detection circuit has an AND gate, a first transistor switch, and a second transistor switch. The AND gate includes an input terminal and an output terminal. The input terminal is connected to at least one idle pin of a connection interface and is normally maintained at a high level, so that the output terminal is maintained at the high level. The first transistor switch includes a first gate, a first drain, and a first source. The output terminal of the AND gate is connected to the first gate. The first drain is connected to a first high-level voltage source. The first source is grounded. The second transistor switch has a second gate, a second drain, and a second source. The second gate is connected to the first drain and the first high-level voltage source. The second drain is connected to the system power supply. The second source is connected to a power input pin of the connection interface.

In at least one embodiment of this disclosure, the power management system further includes a plurality of computing nodes. Each of the computing nodes is configured to be respectively provided with the power consumption devices and be provided with at least one of the PSUs, and respectively includes a node fan set. Each node fan set includes a plurality of system fans. The power management circuit detects whether there is a central processing unit in the power consumption devices of each of the computing nodes. When there is no central processing unit, the power management circuit switches each of the system fans in a corresponding node fan set to a first revolution rate or turns off each of the system fans. When there is the central processing unit, the power management circuit switches each of the system fans in the corresponding node fan set to a second revolution rate; wherein the second revolution rate is greater than the first revolution rate.

In at least one embodiment of this disclosure, each of the computing nodes further includes a node temperature sensor configured to detect a partition temperature of a region in which each of the computing nodes is located, and transmit the partition temperature to the power management circuit. When there is no central processing unit, and the corresponding partition temperature is greater than a partition temperature threshold, the power management circuit switches each of the system fans in the corresponding node fan set to a third revolution rate; wherein the third revolution rate is greater than the first revolution rate.

In at least one embodiment of this disclosure, the power management circuit continuously detects a current device temperature of each of the power consumption devices, and detects a current power supply temperature and a current load of each of the PSUs. The power management circuit determines whether each of the current device temperatures and each of the current power supply temperatures are respectively greater than corresponding thresholds. When each of the current device temperatures, each of the current power supply temperatures, and each of the current loads are not greater than the corresponding thresholds, the power management circuit determines a total load of a plurality of system fans, so as to determine an enabled number and revolution rates of system fans to be turned on. When one of each of the current device temperatures, each of the current power supply temperatures, and each of the current loads is greater than a corresponding threshold, the power management circuit turns on all of the PSUs and the system fans.

In at least one embodiment of this disclosure, the power consumption devices are classified into a first category and a second category by the power management circuit. When there is the first category and there is no second category, and each of the current device temperatures in each of the power consumption devices in the first category is not greater than the corresponding threshold, the power management circuit switches the total load of the system fans to a first fan load. When there are both the first category and the second category, and each of the current device temperatures of each of the power consumption devices in the first category and the second category is not greater than the corresponding threshold, the power management circuit switches the total load of the system fans to a second fan load; wherein the second fan load is greater than the first fan load.

In at least one embodiment of this disclosure, the power management circuit sets a plurality of temperature intervals and a plurality of load intervals. An intersection between each of the temperature intervals and one of the load intervals has a corresponding fan load. When a current power supply temperature of each of the PSUs is in each of the temperature intervals, the power management circuit obtains the corresponding fan load according to the intersection between a temperature interval and a load interval in which the current load is located, to switch a power supply fan of each of the PSUs.

This disclosure further provides a power management method configured to switch of a plurality of power supply units (PSUs) between turn-on and turn-off. The PSUs are configured to supply electricity power to a plurality of connection interfaces. The connection interfaces are configured to be respectively connected to one of a plurality of power consumption devices. The method includes: obtaining a current total load of the plural PSUs and determining a target load of each of the PSUs; detecting a connection status of each of the connection interfaces to determine whether each of the connection interfaces is connected to one of the power consumption devices; turning off power supply to a connection interface that is not connected to one of the power consumption devices; determining an enabled number of the PSUs to be turned on according to the current total load and the target load of each of the PSUs; and turning on or turning off each of the PSUs according to the enabled number, so that a current load of each of the PSUs to be turned on is close to the target load.

In at least one embodiment of this disclosure, the power management method further includes: providing a plurality of computing nodes, where each of the computing nodes is configured to be respectively provided with a plurality of power consumption devices, is provided with at least one of the PSUs and a node fan set, and each node fan set includes a plurality of system fans; and detecting whether there is a central processing unit in the power consumption devices of each of the computing nodes; when there is no central processing unit, switching each of the system fans in a corresponding node fan set to a first revolution rate or turning off each of the system fans; and when there is the central processing unit, switching each of the system fans in the corresponding node fan set to a second revolution rate, wherein the second revolution rate is greater than the first revolution rate.

In at least one embodiment of this disclosure, the power management method further includes: detecting a partition temperature in a region in which each of the computing nodes is located; and when there is no central processing unit, and the corresponding partition temperature is greater than a partition temperature threshold, switching each of the system fans in the corresponding node fan set to a third revolution rate, wherein the third revolution rate is greater than the first revolution rate.

In at least one embodiment of this disclosure, the power management method further includes: detecting a current device temperature of each of the power consumption devices, and detecting a current power supply temperature and a current load of each of the PSUs, and determining, by the power management circuit, whether each of the current device temperatures and each of the current power supply temperatures are respectively greater than corresponding thresholds. When each of the current device temperatures, each of the current power supply temperatures, and each of the current loads are not greater than the corresponding thresholds, determining a total load of a plurality of system fans, so as to determine an enabled number and a revolution rate of system fans to be turned on. When one of each of the current device temperatures, each of the current power supply temperatures, and each of the current loads is greater than a corresponding threshold, turning on all of the PSUs and the system fans.

In at least one embodiment of this disclosure, the method further includes classifying the power consumption devices into a first category and a second category; when there is the first category and there is no second category, and each of the current device temperatures in each of the power consumption devices in the first category is not greater than a corresponding threshold, switching the total load of the system fans to a first fan load; and when there are both the first category and the second category, and each of the current device temperatures of each of the power consumption devices in the first category and the second category is not greater than the corresponding threshold, switching the total load of the system fans to a second fan load; wherein the second fan load is greater than the first fan load.

In at least one embodiment of this disclosure, the power management method further includes: setting a plurality of temperature intervals and a plurality of load intervals, wherein an intersection between each of the temperature intervals and one of the load intervals has a corresponding fan load; and when a current power supply temperature of each of the PSUs is in each of the temperature intervals, obtaining the corresponding fan load according to the intersection between the temperature interval and the load interval in which the current load is located, to switch a power supply fan of each of the PSUs.

In this disclosure, the power management system determines whether to supply electricity power to a connection interface according to a connection status of the connection interface. Supplying no power to an idle connection interface can avoid not only direct loss of the connection interface but also energy loss caused by power rectification and voltage regulation during power transfer from the PSU to the connection interface. Similarly, after the foregoing process is avoided, power consumption required for system cooling can be further avoided, so that overall energy consumption can be effectively reduced. In addition, by turning on and turning off each of the PSUs, the PSU can operate under the target load, improving work efficiency of the PSUs and further relieving system power consumption. In at least one embodiment of this disclosure, the total load of the system fans is further managed, further reducing unnecessary power consumption.

BRIEF DESCRIPTION OF THE DRAWINGS

This disclosure will become more fully understood from the detailed description given herein below for illustration only, and thus not limitative of this disclosure, wherein.

DETAILED DESCRIPTION

Figure 1:
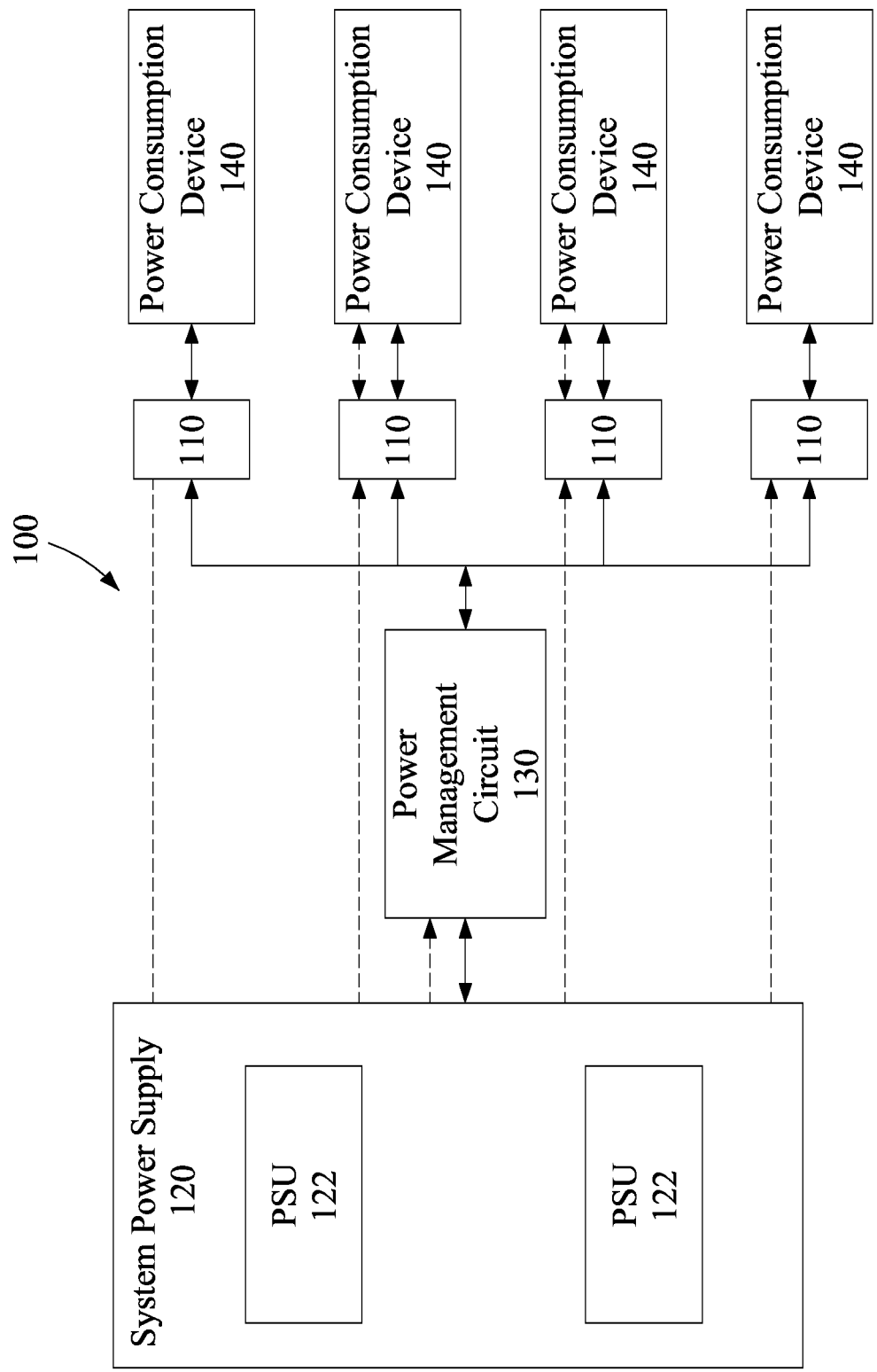
FIG. 1 is a circuit block diagram of a power management system according to a first embodiment of this disclosure.
Figure 2:
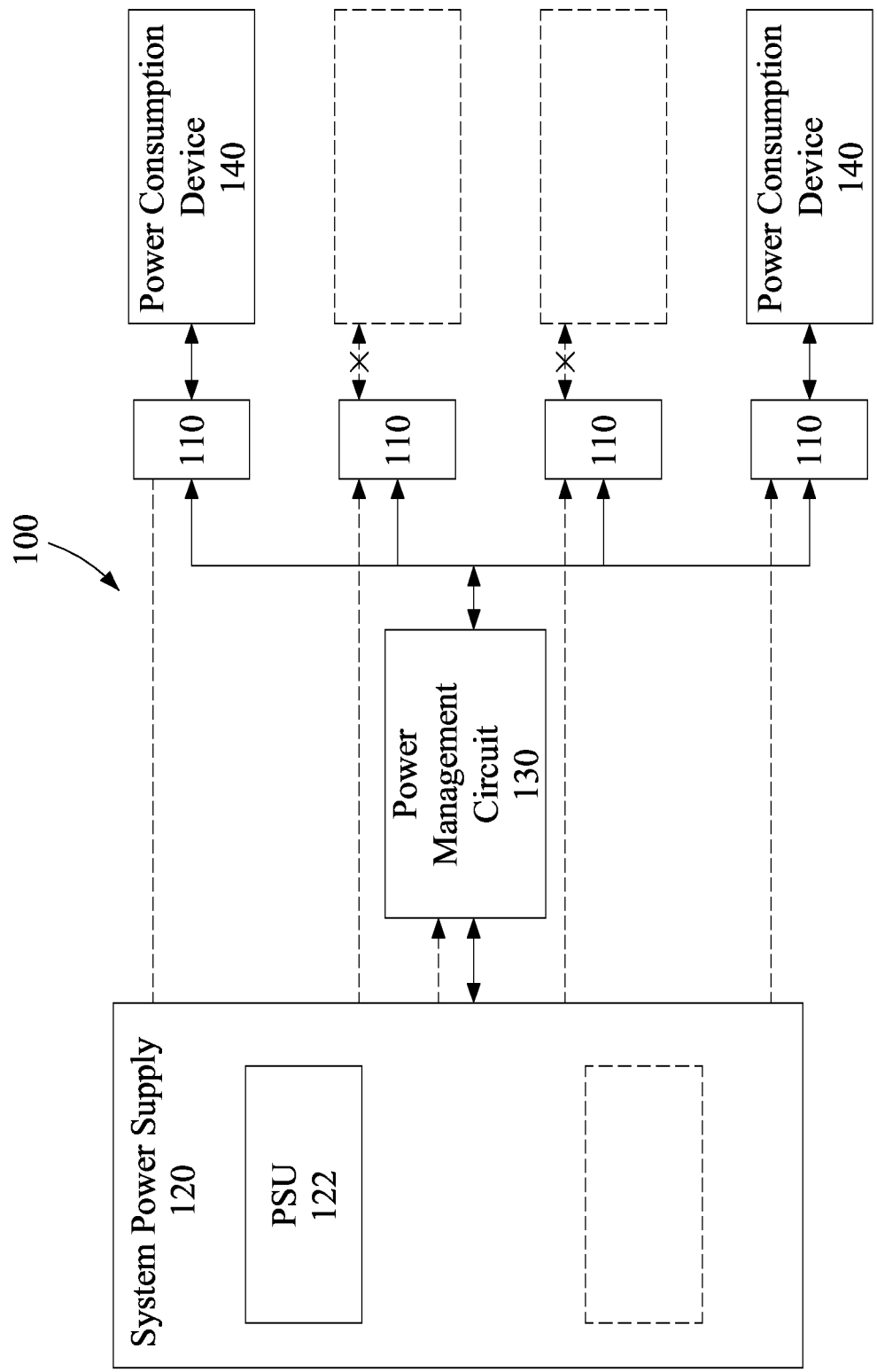
FIG. 2 is another circuit block diagram of the power management system according to the first embodiment of this disclosure.

FIG. 1 and FIG. 2 are circuit block diagrams of a power management system 100 according to a first embodiment of this disclosure. The power management system 100 is disposed in a computer system for performing a power management method. The power management system 100 includes a plurality of connection interfaces 110, a system power supply 120, and a power management circuit 130.

As shown in FIG. 1, each of the connection interfaces 110 is configured to be connected to a power consumption device 140, thereby performing signal transmission and power transmission on the power consumption device 140. The connection interface 110 may be a single slot and is configured to transmit power and a signal simultaneously. The connection interface 110 may also be a combination of a plurality of electrical connectors. Each of the electrical connectors transmits signals and power respectively. The foregoing power consumption device 140 may be, but is not limited to, a central processing unit, a memory, a hard disk device (HDD), a PCI-E device, or other devices that may be controlled by the power management circuit 130 and supplied with power by the system power supply 120.

As shown in FIG. 1, the system power supply 120 includes a plurality of power supply units 122 (PSUs 122). The power management circuit 130 sets a target load for each of the PSUs 122. Generally, an output load of a power supply unit 122 closer to the optimal load indicates work efficiency (a ratio of supply electricity power to input power) of the power supply unit 122 closer to the optimal work efficiency. Therefore, the target load may be the optimal load of the power supply unit 122, but other values are not excluded. Taking the 80 PLUS standard as an example, regardless of a level of the power supply unit 122, the power supply unit 122 has optimal work efficiency at a load of 50%. However, when the system is partially or completely idle, if all of the PSUs 122 are turned on, a load allocated to each power supply unit 122 may be much lower than 50%, resulting in poor work efficiency. At this time, the target load may be set to 50% of the optimal load. The system power supply 120 is configured to supply electricity power to each of the connection interfaces 110 so as to supply electricity power to corresponding power consumption devices 140 through the connection interfaces 110. It is understood that the term "plural" indicates two or more than two.

Figure 6:
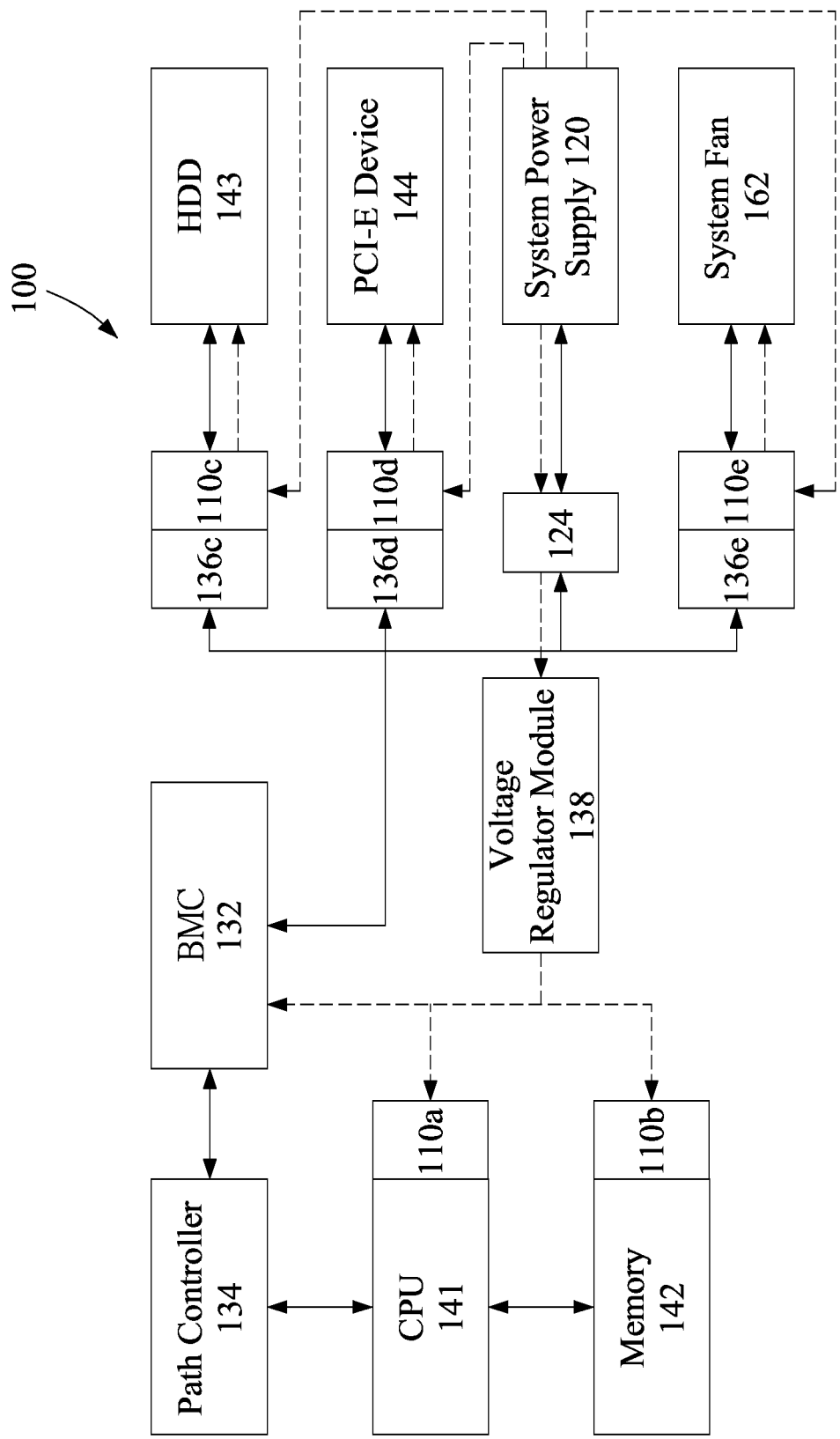
FIG. 6 is a circuit block diagram of a power management system according to a second embodiment of this disclosure.

As shown in FIG. 1 and FIG. 6, the power management circuit 130 may be a combination of a baseboard management control 132 (BMC 132) and necessary detection circuits 136c-136e. The power management circuit 130 is connected to each of the power consumption devices 140 through the connection interface 110. The power management circuit 130 can transmit control signals to each of the power consumption devices 140 and can receive responses from each of the power consumption devices 140. The power management circuit 130 is further electrically connected to the system power supply 120 to obtain operation information of the PSUs 122, including but not limited to an allowable maximum load and a current load of each of the PSUs 122. The power management circuit 130 is configured to turn on or turn off each of the PSUs 122. The power management circuit 130 further obtains the optimal load of the power supply unit 122. The optimal load is used as the target load. FIG. 1 shows signal transmission paths by using solid lines and power transmission paths by using dashed lines. The signal transmission is a two-way transmission including: the transmissions that the power management circuit 130 outputs a control signal and receives a signal returned by the power supply unit 122 and the power consumption device 140. Power transmission is usually one-way transmission from the system power supply 120 to the power management circuit 130 and each of the connection interfaces 110.

Figure 7:
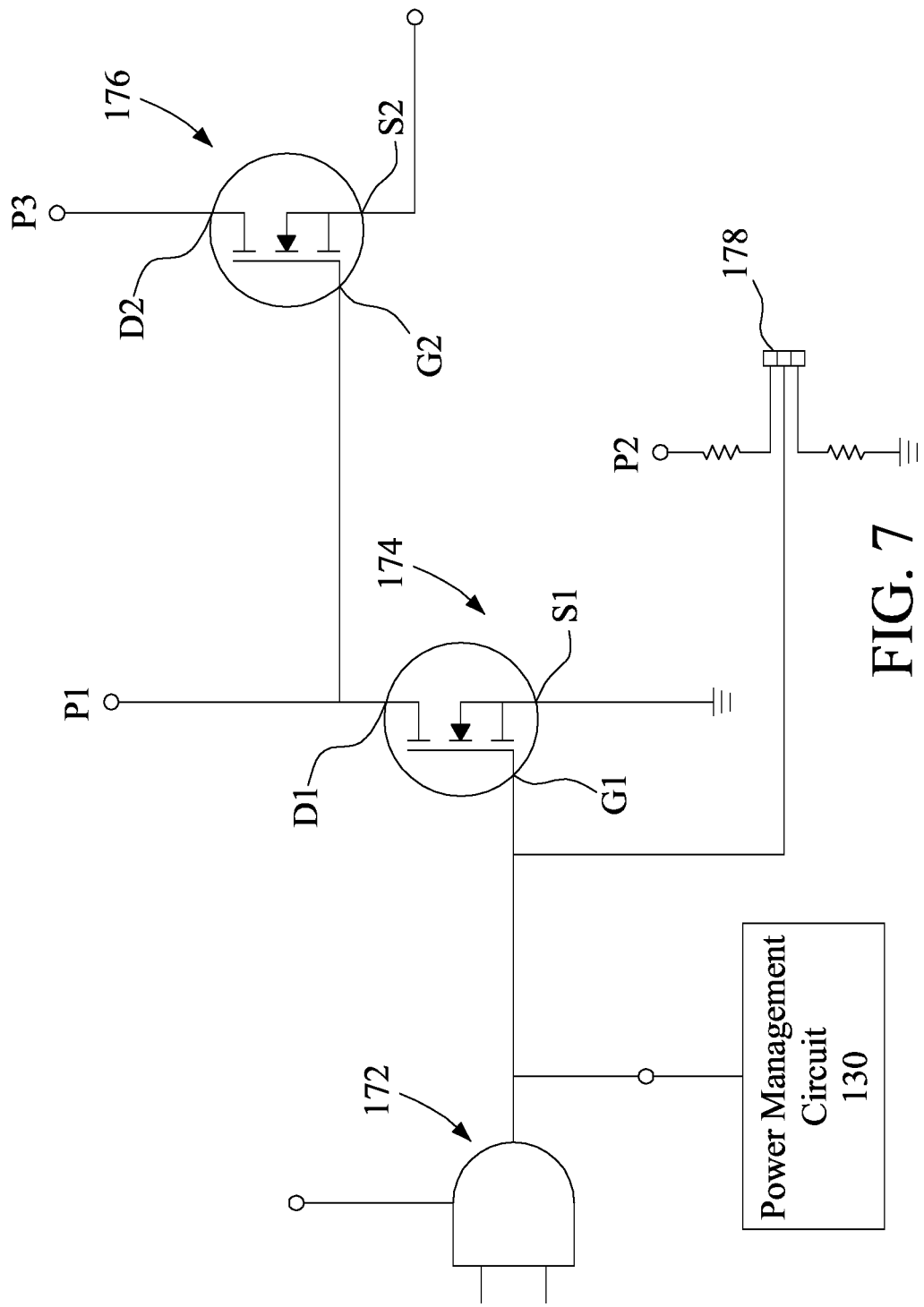
FIG. 7 is an exemplary circuit diagram of a detection circuit according to one or more embodiments of this disclosure.

As shown in FIG. 1 and FIG. 2, the power management circuit 130 is further configured to determine whether each of the connection interfaces 110 is connected to the power consumption device 140. A determining method for the power management circuit 130 is not limited to a single method. In one specific embodiment, the power management circuit 130 determines, through presence or absence of a status signal returned by a designated pin in a connection interface 110, whether the connection interface 110 is connected to the power consumption device 140. The status signal includes a presence signal, an enable signal, or an operation parameter (such as a work clock) that are periodically issued by the device or returned for an inquiry by the power management circuit 130, or a temperature signal issued by a device temperature sensor built in the device through a designated pin. As shown in FIG. 6 and FIG. 7, the status signal may be a change in a voltage level of the designated pin. In another specific embodiment, the power management circuit 130 detects, by using a detection circuit of detection circuits 136c-136e, whether an idle pin of the connection interface 110 is connected to a corresponding pin of the power consumption device 140, thereby detecting whether each of the connection interfaces 110 is connected to one of the power consumption devices 140.

Figure 3:
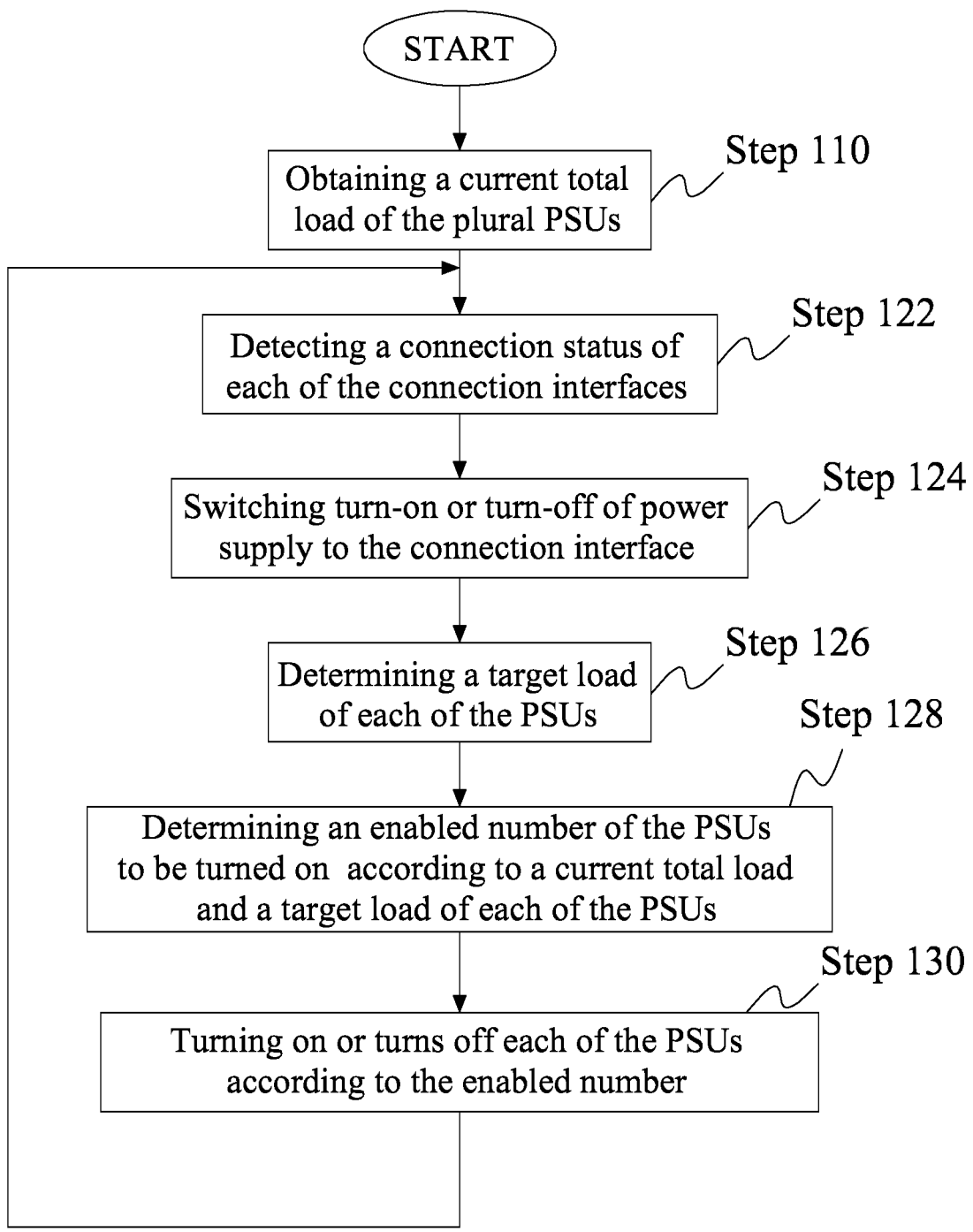
FIG. 3 is a flowchart of a power management method according to the first embodiment of this disclosure.

As shown in FIG. 1, FIG. 2 and, FIG. 3, a process in which the power management system 100 performs the power management method is described as follows.

After the power management system 100 is enabled, the power management circuit 130 performs load detection and obtains a current load of each of the PSUs 122, so as to obtain a current total load of the plural PSUs 122, as shown in Step 110.

Next, the power management circuit 130 detects a connection status of each of the connection interfaces 110 to determine whether the system power supply 120 supplies power to a connection interface 110, as shown in Step 122. The power management circuit 130 then switches turn-on or turn-off of power supply to the connection interface 110 according to the connection status, as shown in Step 124. The power management circuit 130 mainly turns off power supply to a connection interface 110 that is not connected to the power consumption device 140.

In Step 122, the power management circuit 130 may directly control each of the PSUs 122 and directly switch turn-on or turn-off of output of a specific power output pin. The power management circuit 130 may further switch on or off a power transmission path between the system power supply 120 and a corresponding connection interface 110 through handover between switches (for example, a transistor switch).

The power management circuit 130 determines a target load of each of the PSUs 122, as shown in Step 126. The power management circuit 130 determines an enabled number of the PSUs 122 to be turned on according to a current total load and a target load of each of the PSUs 122, as shown in Step 128. The enabled number of power supply units to be turned on is used for causing the current load of each of the PSUs 122 to be turned on to be close to the target load as much as possible, so that work efficiency of each of the PSUs 122 is close to the target value. For example, a power supply unit 122 conforming to the 80 PLUS standard has optimal work efficiency at a load of 50%. Therefore, the enabled number of power supply units to be turned on may be set to allow the PSUs 122 to be turned on to be maintained to be close to 50%, and the PSUs 122 to be turned on may operate at the optimal work efficiency.

Finally, the power management circuit 130 turns on or turns off each of the PSUs 122 according to the enabled number of power supply units to be turned on, as shown in Step 130. The power management circuit 130 returns to Step 122 for detection. The power management circuit 130 continuously detects a connection status of each of the connection interfaces 110 to switch the PSUs 122 between turn-on and turn-off at all time.

As shown in FIG. 1, when the power management circuit 130 detects that each of the connection interfaces 110 is connected to a power consumption device 140, the power management circuit 130 switches power supply to all of the connection interfaces 110 to enable. At this time, if the two PSUs 122 supply electricity power simultaneously, a current load of each of the PSUs 122 to be turned on is caused to be close to the target load. Then, the power management circuit 130 maintains the two PSUs 122 to be simultaneously enabled.

As shown in FIG. 2, when the power management circuit 130 detects that some of the connection interfaces 110 are not connected to the power consumption device 140, the power management circuit 130 switches power supply to the connection interfaces 110 to turn-off. At this time, a current total load of the plural PSUs 122 decreases. If one power supply unit 122 can supply electricity power to cause the current load of each of the PSUs 122 to be turned on to be close to the target load, the power management circuit 130 turns off one power supply unit 122, leaving only one power supply unit 122 enabled.

It should be noted that illustrations in FIG. 1 and FIG. 2 are merely simplified description, and do not limit actual enabled numbers of the PSUs 122 and the power consumption devices 140. In addition, power consumption of each power consumption device 140 also varies depending on a device type. The PSUs 122 are also not necessarily limited to a same specification. The PSUs 122 may also have different specifications, and may be set to different target loads. The power management circuit 130 may determine, based on a load ratio, the target load, and the current total load of the PSUs 122, which of the PSUs 122 is to be turned on, so that a respective current load of the PSUs 122 to be turned on can be close to the target load thereof.

Figure 4:
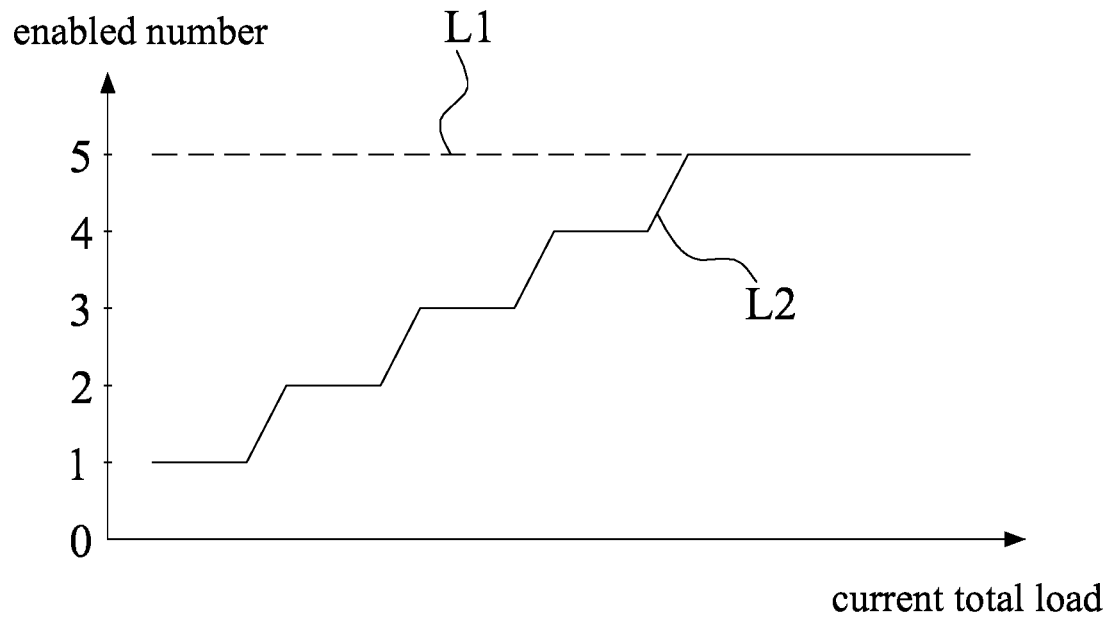
FIG. 4 shows a correspondence between a current total load and an enabled number of power supply units to be turned on for comparison between the power management system in the art and this disclosure.
Figure 5:
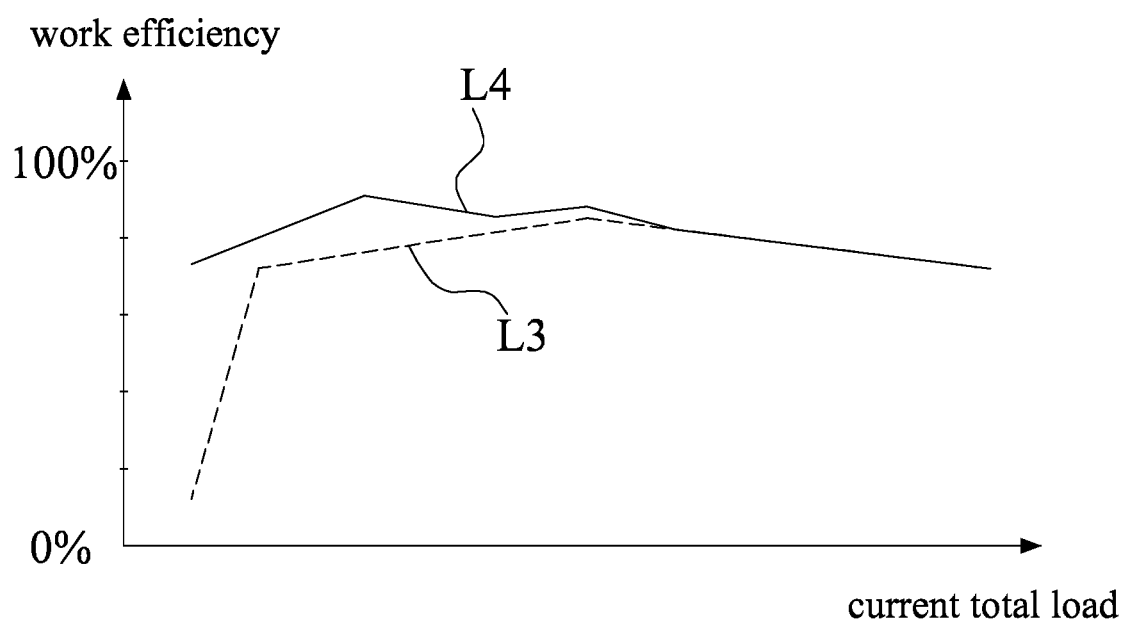
FIG. 5 shows a correspondence between the current total load and work efficiency for comparison between the power management system in the art and this disclosure.

FIG. 4 and FIG. 5 show schematic comparisons between this disclosure and the power management system in the art.

In FIG. 4, a curve L1 is a correspondence between a current total load and an enabled number of PSUs 122 to be turned on in the art (assuming that the PSUs 122 are the same in this disclosure and the power management system in the art), and a curve L2 is correspondence between a current total load and an enabled number of PSUs 122 of this disclosure. In FIG. 5, a curve L3 is a correspondence between the current total load and work efficiency in the art, and a curve L4 is a correspondence between the current total load and work efficiency of this disclosure.

As shown in the curve L1 and curve L3 in FIG. 4 and FIG. 5, in the art, regardless of a current total load of a system power supply 120, all PSUs 122 are in turn-on states and the current loads are allocated together. Therefore, when the current total load of the system power supply 120 is relatively low, a respective current load of each of the PSUs 122 may be much lower than the optimal load, resulting in relatively low work efficiency. Only after the current total load of the system power supply 120 is relatively increased can relatively good work efficiency be achieved.

As shown in the curve L2 and curve L4 in FIG. 4 and FIG. 5, in this disclosure, when the current total load of the system power supply 120 is relatively low, an enabled number of PSUs 122 to be turned on is also adjusted according to the target load, so that the respective current load of each of PSUs 122 to be turned on may be close to the optimal load, thereby maximizing the work efficiency and avoiding excessive unnecessary power consumption caused when the system is completely or partially idle.

As shown in FIG. 6, a circuit block diagram of a power management system 100 according to a second embodiment of this disclosure is shown. The power management system 100 is configured to perform a power management method. The power management system 100 includes a plurality of connection interfaces 110a-110e, a system power supply 120, and a power management circuit.

As shown in FIG. 6, the connection interfaces 110a-110e are configured to be connected to the power consumption devices. The power consumption device 140 includes but is not limited to a central processing unit 141, a memory 142, a hard disk device 143 (HDD 143), a PCI-E device 144, and a system fan 162. Only one of various types of power consumption devices is drawn in FIG. 6 as an example. In fact, each type of the power consumption devices may include two or more power consumption devices. The connection interfaces 110a-110e may be a single slot or a combination of a plurality of connectors for matching the power consumption devices.

As shown in FIG. 6, the system power supply 120 is the same as the system power supply 120 of the first embodiment, and includes a plurality of PSUs 122. The power management circuit 130 sets a target load for each of the PSUs 122. The system power supply 120 is connected to the power management circuit 130 through a power distribution board (PDB) 124, so that the power management circuit 130 can switch each of the PSUs 122 between turn-on and turn-off through the PDB 124. The system power supply 120 outputs power to various elements through the PDB 124 to supply electricity power. In addition, as shown in FIG. 6, the system power supply 120 may directly output a fixed voltage (3 V, 5 V, and 12 V) to each of the connection interfaces 110c-110e. The fixed voltage is converted into an appropriate voltage through a power management chip on the connection interfaces 110c-110e and then supplied to each corresponding power consumption devices 143, 144, and 162. Power output by the system power supply 120 may also be regulated by a voltage regulator module 138. The power is converted into an appropriate voltage and then supplied to corresponding power consumption devices 141, 142 through the connection interfaces 110a, 110b. As shown in FIG. 6, power transmitted to the central processing unit 141 and the memory 142 is first regulated by the voltage regulator module 138. Power transmitted to the hard disk device 143, the PCI-E device 144, and the system fan 162 is converted by a power management chip on the corresponding connection interfaces 110c-110e, and even converted by a power management circuit of the power consumption device 143, 144, 162.

As shown in FIG. 6, the power management circuit 130 includes a BMC 132, a path controller 134, and detection circuits 136c-136e. For different power consumption devices 141-144, 162, the BMC 132 performs connection in different ways, and detects, in different ways, whether the power consumption devices 141-144, 162 are connected to the corresponding connection interfaces 110a-110e.

The central processing unit 141 (CPU 141) and the memory 142 are connected to the BMC 132 through the path controller 134. The path controller 134 may be a combination of a south bridge and a north bridge, a platform control hub (PCH), a memory controller hub (MCH), an I/O control hub (ICH), an AMD fusion controller hub, etc. When the central processing unit 141 and the memory 142 are connected to the corresponding connection interface 110a, 110b, the central processing unit 141 and the memory 142 may return an enable signal, a presence signal, a temperature signal, or other operation parameters through designated pins as status signals. The status signals are transmitted to the BMC 132 through the path controller 134, so that the BMC 132 can determine whether the central processing unit 141 and the memory 142 are connected to the corresponding connection interfaces 110a, 110b, thereby determining whether power is supplied to each of the connection interfaces 110a, 110b.

For other power consumption devices 140, such as the hard disk device 143, the PCI-E device 144, and the system fan 162, it is detected by using idle pins of the connection interfaces 110c-110e through the detection circuits 136c-136e, whether the idle pins are connected to corresponding pins of power consumption devices 143, 144, 162, and it is determined, through a change in an voltage level, whether there are the power consumption devices 143, 144, 162 on the connection interfaces 110c-110e respectively.

FIG. 7 is an example of the detection circuits 136c-136e, which are configured to detect changes in voltage levels of designated pins (idle pins) of the connection interfaces 110c-110e. The detection circuits 136c-136e have an AND gate 172, a first transistor switch 174, and a second transistor switch 176. The first transistor switch 174 and the second transistor switch 176 may be N-channel enhancement MOSFETs.

As shown in FIG. 7, an input terminal of the AND gate 172 is normally connected to the idle pins of the connection interfaces 110c-110e and is maintained at a high level, so that an output terminal of the AND gate 172 is maintained at the high level. The output terminal of the AND gate 172 is connected to a first gate G1 of a first transistor switch 174. A first drain D1 of the first transistor switch 174 is connected to a first high-level voltage source P1. A first source S1 is grounded. A second gate G2 of the second transistor switch 176 is connected to the first drain D1 and the first high-level voltage source P1. A second drain D2 is connected to an output terminal P3 of a system power supply 120. The second source S2 is directly or indirectly connected to a power input pin of the connection interfaces 110c-110e.

As shown in FIG. 7, when the connection interfaces 110c-110e are not connected to the power consumption devices 143, 144, 162, the idle pins of the connection interfaces 110c-110e form a dead contact and are maintained at a high level, and the input terminal of the AND gate 172 are also maintained at the high level, so that the output terminal of the AND gate 172 is also maintained at a high level. At this time, the first transistor switch 174 is switched on, and the first high-level voltage source P1 is grounded through the first drain D1 and the first source S1, so that the second gate G2 is maintained at a low level. Therefore, the second transistor switch 176 is switched off, so that the second drain D2 and the second source S2 are disconnected, and the output terminal P3 of the system power supply 120 does not supply electricity power to power input pins of the connection interfaces 110c-110e.

When the connection interfaces 110c-110e are connected to the power consumption devices 143, 144, 162, the idle pins of the connection interfaces 110c-110e are connected to the corresponding pins of the power consumption devices 143, 144, 162, so that the voltage level decreases to a low level. The idle pins of the connection interfaces 110c-110e are connected to the input terminal of the AND gate 172, so that the input terminal of the AND gate 172 also drops to a low level. Therefore, the voltage level of the first gate G1 decreases to the low level. At this time, the first transistor switch 174 is switched off, so that the first drain D1 and the first source S1 are disconnected. Output of the first high-level voltage source P1 is no longer grounded, so that the second gate G2 is raised to a high level. The second drain D2 and the second source S2 are switched on, so that the output terminal P3 of the system power supply 120 outputs power to the power input pins of the connection interfaces 110c-110e.

As shown in FIG. 7, in addition, the first gate G1 of the first transistor switch 174 may be connected to the power management circuit 130. When the power consumption devices 143, 144, 162 are plugged into the connection interfaces 110c-110e, but the power consumption devices 143, 144, 162 are set to be idle, the power management circuit 130 may output a level signal to cause the first gate G1 to be raised to a high level. In this way, the second transistor switch 176 is maintained to be disconnected and does not supply electricity power to the power input pins of the connection interfaces 110c-110e.

As shown in FIG. 7, the first gate G1 of the first transistor switch 174 may also be connected to a second high-level voltage source P2 through a manual switch 178. Similarly, when the power consumption devices 143, 144, 162 are plugged into the connection interfaces 110c-110e, but the power consumption devices 143, 144, 162 are set to be idle, the manual switch 178 may be switched on. The second high-level voltage source P2 maintains the first gate G1 at the high level, so that the second transistor switch 176 is maintained to be disconnected and does not supply electricity power to the power input pins of the connection interfaces 110c-110e. The manual switch 178 may be a jumper switch or a toggle switch.

Figure 8:
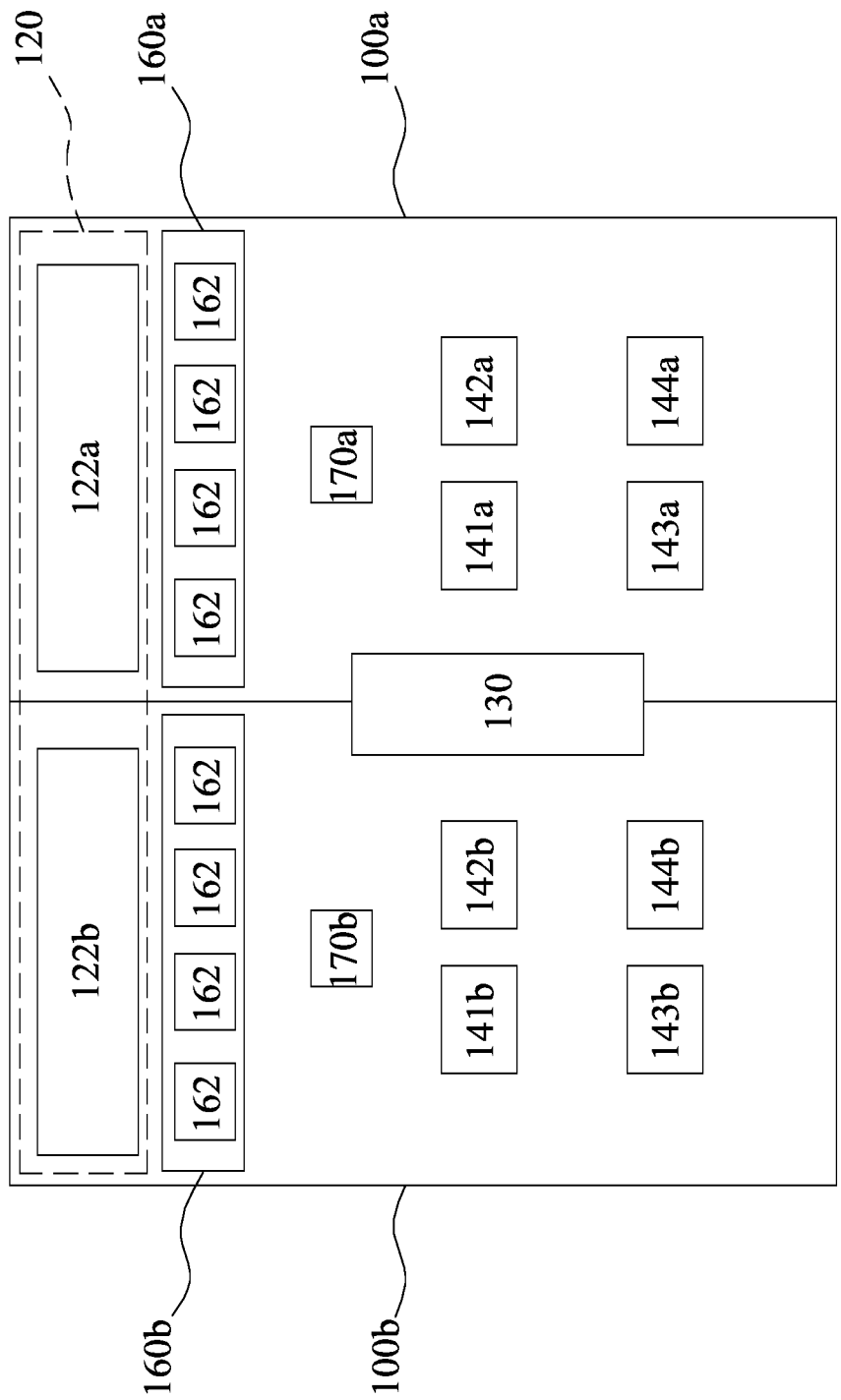
FIG. 8 and FIG. 9 are schematic diagrams of a power management system disposed in a computer system according to a third embodiment.
Figure 9:
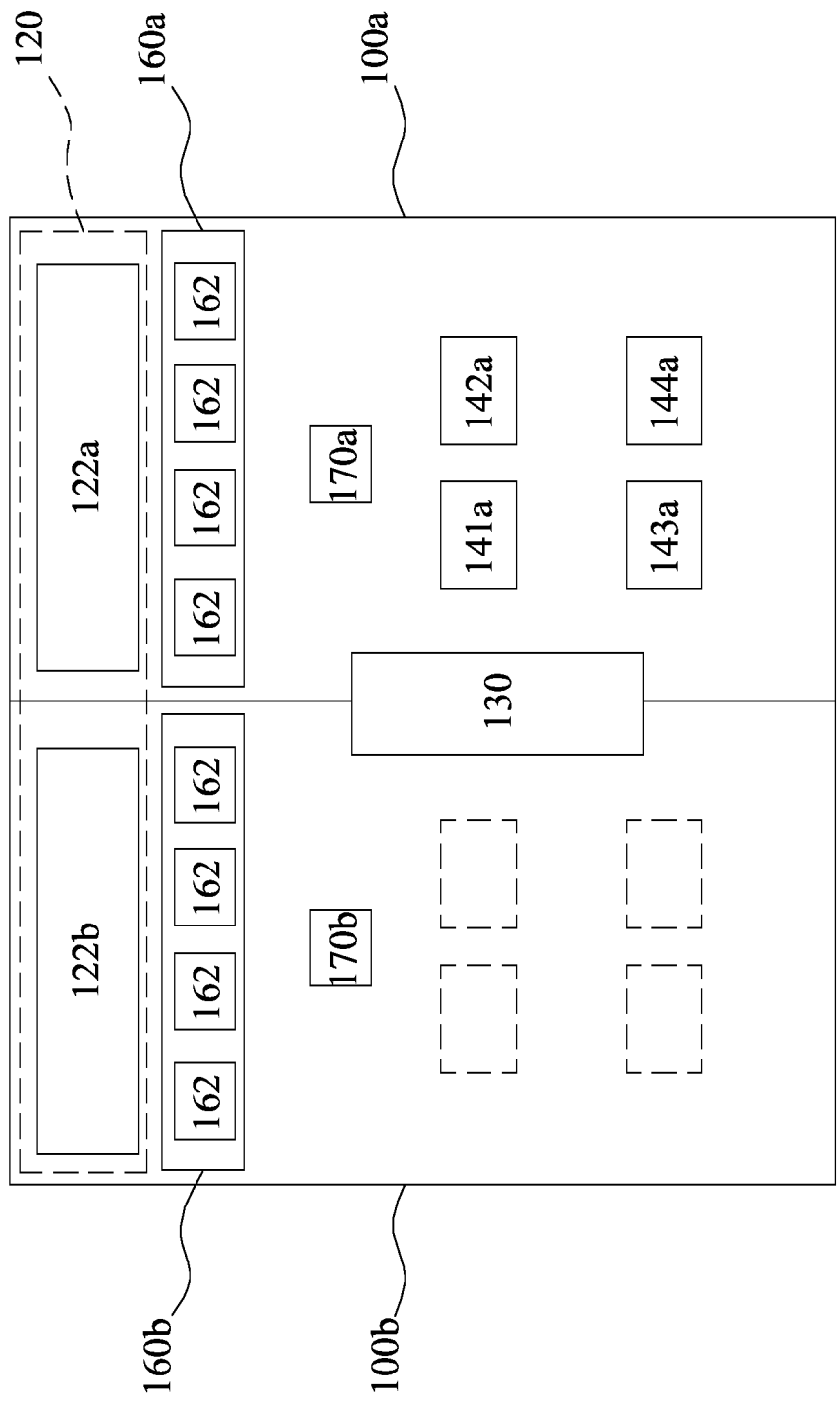

Referring to FIG. 8 and FIG. 9, a power management system 100 disclosed in a third embodiment of this disclosure is shown. The power management system 100 is disposed in a computer system and configured to perform a power management method. The power management system 100 includes a plurality of computing nodes 100a, 100b, a power management circuit 130, and a system power supply 120. Each of the computing nodes 100a, 100b is respectively configured to be provided with a plurality of power consumption devices therein. Each of the computing nodes 100a, 100b includes a node fan set 160a, 160b and a node temperature sensor 170a, 170b. The system power supply 120 includes a plurality of PSUs 122a, 122b. And each of the computing nodes 100a, 100b is provided with at least one power supply unit 122a, 122b.

Each of the node fan sets 160a, 160b may include a plurality of system fans 162. In FIG. 9, drawing of a connection interface is omitted, but a plurality of power consumption devices are still connected to the power management circuit 130 through the connection interface. The node temperature sensors 170a, 170b detect partition temperatures of regions in which the computing nodes 100a, 100b are respectively located, and transmit the partition temperatures to the power management circuit 130 respectively.

The power consumption device 140 includes, but is not limited to, central processing units 141a, 141b, memories 142a, 141b, hard disk devices 143a, 143c, and PCI-E devices 144a, 144b. The PSUs 122 of the power consumption devices and the system power supplies 120a, 120b are respectively provided with device temperature sensors to respectively transmit current device temperatures and current power supply temperatures to the power management circuit 130.

As shown in FIG. 8 and FIG. 9, the power management circuit 130 may detect, through the connection interface 110, whether there is a central processing unit 141a in a power consumption device of the computing node 100a and a central processing unit 141b in a power consumption device of the computing node 100b. Whether there are the central processing units 141a, 141b represents whether the corresponding computing nodes 100a, 100b are operating. Therefore, when there is no central processing unit 141b (which is shown on a left side of FIG. 9), the power management circuit 130 switches all of the system fans 162 in the corresponding node fan set 160b to a first revolution rate or turns off all of the system fans. When there is a central processing unit 141a (which is shown on a right side of FIG. 9), the power management circuit 130 switches all of the system fans 162 in the corresponding node fan set 160a to a second revolution rate. The second revolution rate is greater than the first revolution rate. In other words, when there is the central processing unit 141a, all of the system fans 162 in the corresponding node fan set 160a operate at a relatively high revolution rate. When there is no central processing unit 141b, all of the system fans 162 in the corresponding node fan set 160b operate at a relatively low revolution rate or are turned off, thereby reducing power consumption of the node fan sets 160a, 160b.

In FIG. 9, the power management circuit 130 continuously receives partition temperatures sent by the node temperature sensors 170a, 170b. When there are no central processing units 141a, 141b and corresponding partition temperatures are greater than a partition temperature threshold, the power management circuit 130 switches each of the system fans 162 in the corresponding node fan set 160a to a third revolution rate, to reduce partition temperatures of the computing node 100a, 100b. The third revolution rate is greater than the first revolution rate.

In each of the computing nodes 100a, 100b, the power management circuit 130 continuously receives a device temperature, and accordingly sets operation enabled numbers and the revolution rates of the system fans 162 in the node fan sets 160a, 160b, and accordingly sets an enabled number of PSUs 122 to be turned on.

Figure 10:
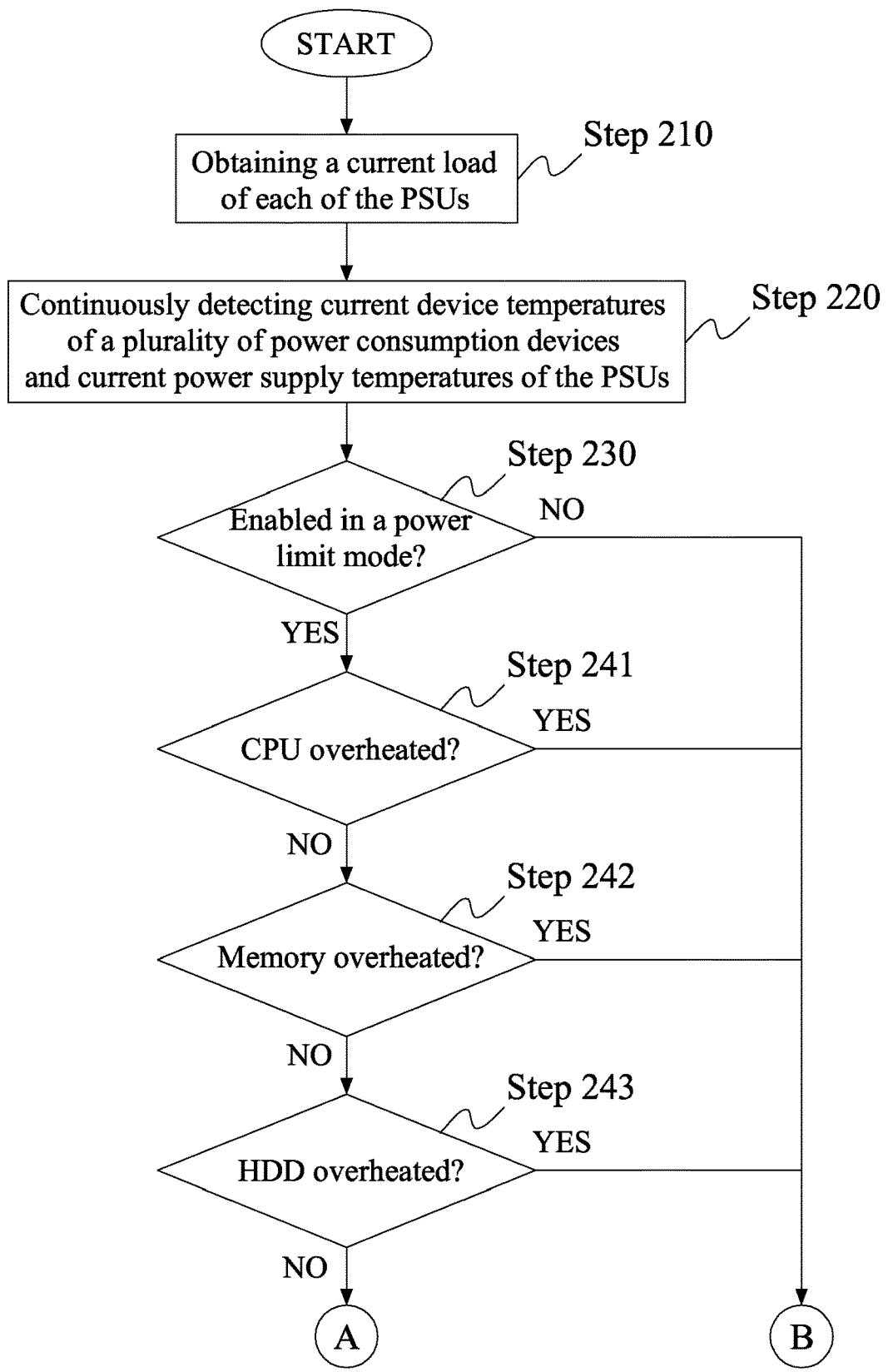
FIG. 10, FIG. 11, and FIG. 12 are flowcharts of a power management method according to the third embodiment of this disclosure.
Figure 11:
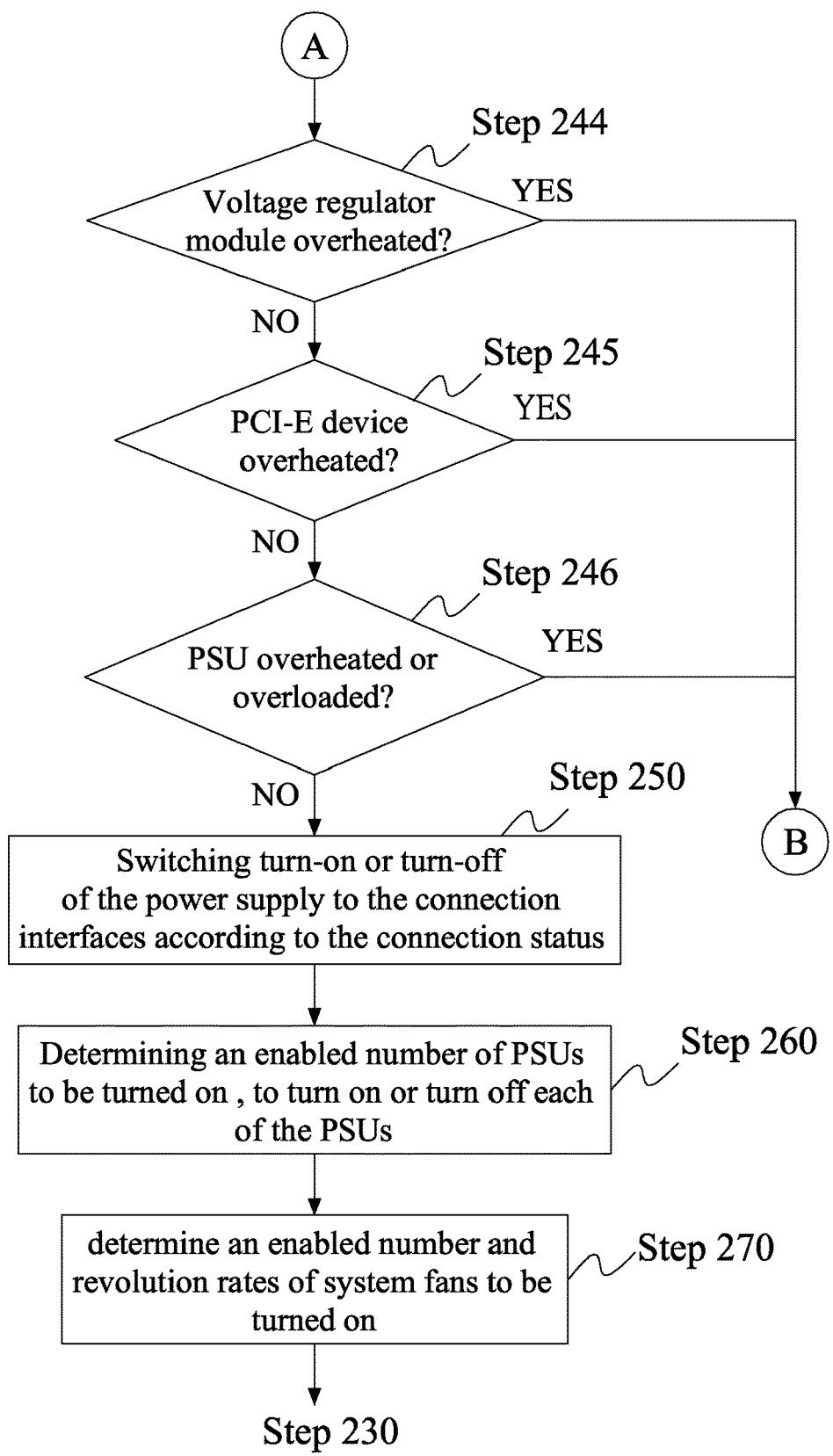

As shown in FIG. 10, FIG. 11 and, FIG. 12, a process in which the power management system 100 performs the power management method is described as follows.

After the power management system 100 is enabled, the power management circuit 130 performs load detection to obtain a current load of each of the PSUs 122, as shown in Step 210. The power management circuit 130 simultaneously determines current online status of the PSUs 122 to obtain a current total load of the PSUs 122.

The power management circuit 130 simultaneously and continuously detects current device temperatures of a plurality of power consumption devices 140 and current power supply temperatures of the PSUs 122, as shown in Step 220. The power management circuit 130 determines whether the power management system 100 is in an idle status based on the current device temperatures and the current power supply temperatures, and accordingly regulates overall power consumption and loads of the PSUs 122.

The power management circuit 130 determines whether the power management system 100 is enabled in a power limit mode, as shown in Step 230. Setting of the power limit mode may be stored in a basic input/output system (BIOS). The power management circuit 130 may perform determining by reading a flag from the BIOS. If the flag indicates disable of the power limit mode, the power management circuit 130 turns on all of the PSUs 122 and switches a total load of the system fans 162 to a maximum total load, as shown in Step 300.

If the flag indicates enable of the power limit mode, the power management circuit 130 starts to determine whether the current device temperature of each of the power consumption devices 140 and a current power supply temperature and a current load of each of the PSUs 122 are respectively greater than corresponding thresholds, as shown in Step 241 to Step 246. The power consumption device 140 shown in Step 241 to Step 245 is merely an example, which is not intended to limit a type of the power consumption devices 140.

If one of the current device temperature of each of the power consumption devices 140 and the current power supply temperatures and the current load of each of the PSUs 122 is greater than a corresponding threshold, the power management circuit 130 turns on all of the PSUs 122 and the system fans 162, as shown in Step 300.

If the current device temperature of each of the power consumption devices 140, the current power supply temperature and current load of each of the PSUs 122 are not greater than the corresponding threshold, the power management circuit 130 also detects a connection status of each of the connection interfaces 110, to determine whether power is supplied by the system power supply 120 to the connection interfaces 110, further switching turn-on or turn-off of the power supply to the connection interfaces 110 according to the connection status, as shown in Step 250.

Finally, the power management circuit 130 determines a target load of each of the PSUs 122. The power management circuit 130 determines an enabled number of PSUs 122 to be turned on according to the current total load and the target load of each of the PSUs 122, to turn on or turn off each of the PSUs 122, as shown in Step 260.

Finally, the power management circuit 130 determines a total load of the system fans 162 according to a detection status of the device, so as to determine an enabled number and revolution rates of system fans 162 to be turned on, as shown in Step 270.

The total load of the system fans 162 is based on a type of the power consumption device 140. In a specific embodiment, the power consumption devices 140 are classified into a first category and a second category by the power management circuit 130. The first category includes power consumption devices 140 that allow a relatively high operation temperature, such as central processing unit, a path controller 134, a memory, a hard disk device backboard, and a voltage regulator module 138. The second category includes power consumption devices 140 that allow a relative low operation temperature, such as a PCI-E device transfer card, a solid state storage device (SSD), and a general purpose graphics processing unit (GPGPU).

Therefore, when there is the first category but there is no second category, and the current device temperature of each of the power consumption devices 140 in the first category is not greater than the corresponding threshold, the power management circuit 130 switches the total load of the system fans 162 to a first fan load. The first fan load may be as low as 1%, so that the system fan 162 can be maintained at a minimum revolution rate, and some system fans 162 may even be turned off.

When there are both the first category and the second category, and the current device temperature of each of the power consumption devices 140 in both the first category and the second category is not greater than the corresponding threshold, the power management circuit 130 switches the total load of the system fan 162 to a second fan load. Because there are more power consumptions devices 140 in the second category, the second fan load needs to be greater than the first fan load, to prevent the current device temperature of the power consumption devices 140 in the second category from exceeding the threshold. The second fan load may be set to about 30%, so as to adjust an enabled number of system fans 162 to be turned on and the revolution rates of the system fans 162. Therefore, when the system is idle, relatively low power consumption of the system fans 162 can be maintained, so as to prevent the system fans 162 from unnecessarily continuously operating at a high load.

Figure 12:
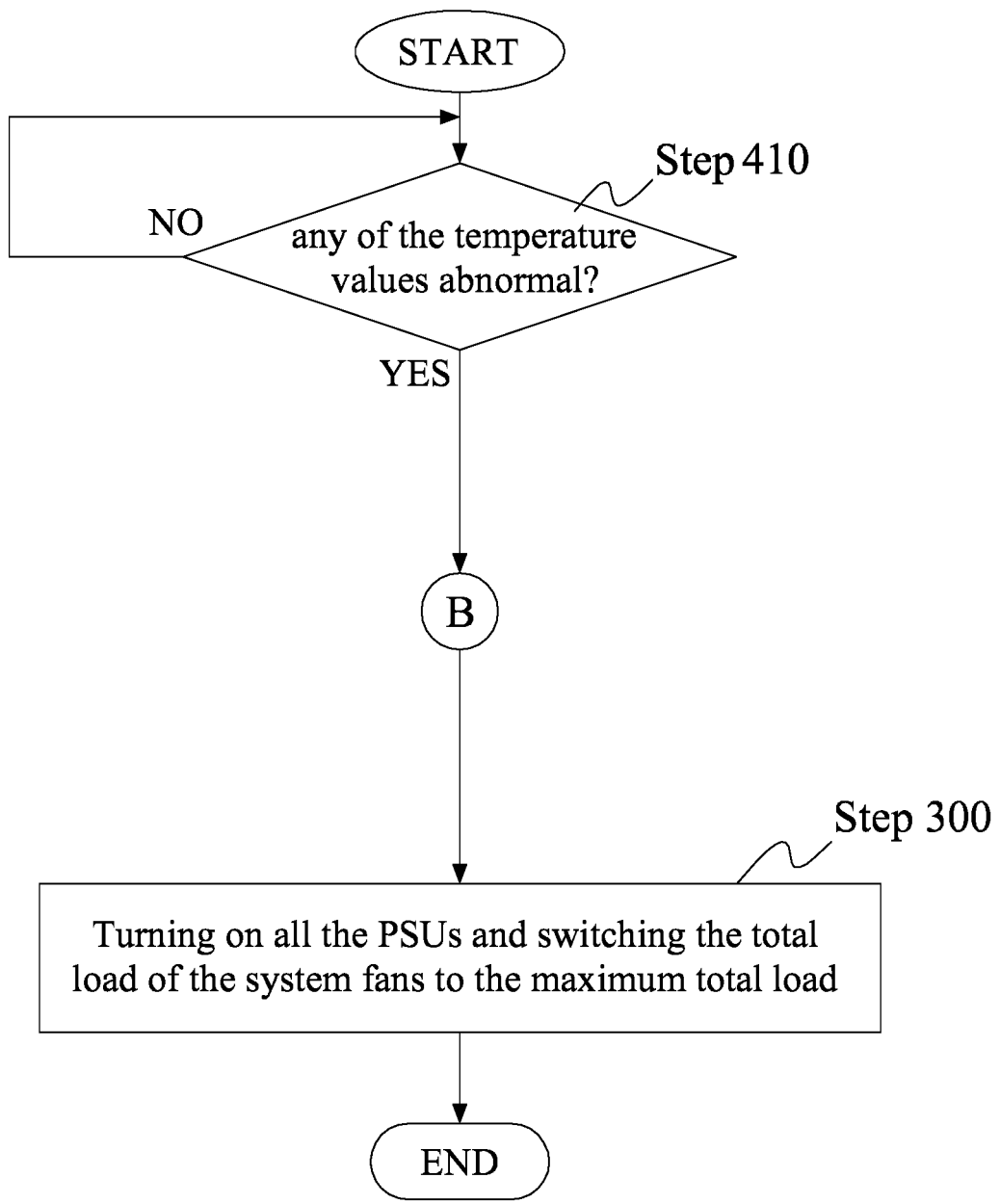

As shown in FIG. 12, during the foregoing regulation, the power management circuit 130 continuously monitors whether any of the temperature values (the current device temperature and the current power supply temperature) is abnormal, as shown in Step 410. If an abnormality occurs, trigger is immediately performed, and Step 300 is performed, to turn on all the PSUs 122 and switch the total load of the system fans 162 to the maximum total load.

The following table 1 illustrates a relationship between the current power supply temperature, the current load, and the fan load. Table 1 is merely an example, and is not intended to limit this disclosure. The power supply unit 122 usually includes a power supply fan and a temperature sensor. The power management circuit 130 may obtain a current power supply temperature and a current load according to the temperature sensor, and set a fan load (a revolution rate) of the power supply fan. The power management circuit 130 may set the current power supply temperature to a plurality of temperature intervals and the current load to a plurality of load intervals. An intersection between each temperature interval and a load interval has a corresponding fan load. When the current power supply temperature is in each of the temperature intervals, the power management circuit 130 obtains a corresponding fan load according to the intersection between the temperature interval and the load interval of the current load, and switches the fan load of the power supply fan.

TABLE 1

| Fan temperature (Celsius) | | Fan load | | | | | | | | |
|---|---|---|---|---|---|---|---|---|---|---|
| Reduced fan load | Increased fan load | <=15% | <=25% | <=35% | <=45% | <=55% | <=65% | <=75% | <=85% | <=100% |
| <=24 |  | 7% | 7% | 10% | 14% | 16% | 22% | 31% | 37% | 52% |
| <=29 | >=26 | 7% | 7% | 10% | 14% | 16% | 26% | 32% | 38% | 55% |
| <=34 | >=31 | 10% | 10% | 16% | 16% | 21% | 27% | 37% | 44% | 65% |
| <=39 | >=36 | 10% | 10% | 16% | 17% | 22% | 32% | 39% | 48% | 80% |
| <=44 | >=41 | 10% | 10% | 16% | 22% | 27% | 37% | 47% | 62% | 100% |
| <=49 | >=46 | 10% | 10% | 16% | 23% | 29% | 41% | 52% | 72% | 100% |
| <=54 | >=51 | 16% | 16% | 21% | 27% | 38% | 52% | 73% | 100% | 100% |
|  | >=56 | 100% | 100% | 100% | 100% | 100% | 100% | 100% | 100% | 100% |

Adjacent temperature intervals have a gap instead of being consecutive. When the current power supply temperature is beyond a current temperature interval but is not in another temperature interval, the power management system temporarily does not switch the fan load until the current power supply temperature is in another temperature interval, to prevent continuous switching of the fan load (revolution rate) during switching of the current power supply temperature between adjacent temperature intervals. For example, the current temperature interval is 26° C.-29° C. When the current temperature is less than 26° C. but greater than or equal to 24° C., the power management system does not reduce the fan load, but maintains an existing fan load. Conversely, when the current temperature is higher than 29° C., but has not yet been in a range of 31-34° C., the power management system temporarily does not increase the fan load.

In at least one embodiment of this disclosure, the power management system determines whether to supply electricity power to the connection interfaces according to connection status of the connection interface. Supplying no power to an idle connection interface can avoid not only direct loss of the connection interface but also energy loss caused by power rectification and voltage regulation during power transfer from the power supply unit to the connection interface. Similarly, after the foregoing processes are avoided, power consumption required for system cooling can be further avoided, so that overall energy consumption can be effectively reduced. In addition, by turning on and turning off each of the power supply units, the power supply unit can operate under the target load, improving work efficiency of the power supply units and further relieving system power consumption. In at least one embodiment of this disclosure, the total load of the system fans is further managed, further reducing unnecessary power consumption.

What is claimed is:

1. A power management system configured to supply electricity power to a plurality of power consumption devices, comprising:
   a plurality of connection interfaces, configured to be respectively connected to one of the power consumption devices to perform signal transmission and power transmission;
   a system power supply, comprising a plurality of power supply units; wherein the system power supply is configured to supply electricity power to each of the connection interfaces, so as to supply electricity power to the power consumption devices through the connection interfaces; and
   a power management circuit, connected to each of the power consumption devices via each of the connection interfaces;
   wherein the power management circuit obtains a current total load of the power supply units, determines a target load of each of the power supply units, and determines whether each of the connection interfaces is connected to one of the power consumption devices; and the power management circuit turns off power supply to the connection interface that is not connected to one of the power consumption devices, and determines an enabled number of the plurality of power supply units to be turned on according to the current total load and the target load of each of the power supply units, so that a current load of each of the power supply units to be turned on is close to the target load;
   wherein the power management circuit determines, through a status signal returned by a designated pin in each of the connection interfaces, whether each of the connection interfaces is connected to one of the plurality of power consumption devices.

2. The power management system according to claim 1, wherein the power management circuit detects, by using a detection circuit, whether each of the connection interfaces is connected to one of the plurality of power consumption devices, wherein the detection circuit includes:
   an AND gate, including an input terminal and an output terminal, wherein the input terminal is connected to at least one idle pin of the connection interface and is normally maintained at a high level, so that the output terminal is maintained at the high level;
   a first transistor switch, including a first gate, a first drain, and a first source, wherein the output terminal of the AND gate is connected to the first gate, and the first drain is connected to a first high-level voltage source, and the first source is grounded; and
   a second transistor switch, including a second gate, a second drain, and a second source, wherein the second gate is connected to the first drain and the first high-level voltage source, the second drain is connected to the system power supply, and the second source is connected to a power input pin of the connection interface.

3. The power management system according to claim 1, further comprising:
   a plurality of computing nodes, configured to be respectively provided with the power consumption devices and be provided with at least one of the power supply units; wherein each of the computing nodes respectively comprises a node fan set, and each node fan set comprises a plurality of system fans;
   wherein the power management circuit detects whether there is a central processing unit in each of the power consumption devices of each of the computing nodes; when there is no central processing unit, the power management circuit switches each of the system fans in a corresponding node fan set to a first revolution rate or turns off each of the system fans; and
   when there is the central processing unit, the power management circuit switches each of the system fans in the corresponding node fan set to a second revolution rate, wherein the second revolution rate is greater than the first revolution rate.

4. The power management system according to claim 3, wherein each of the computing nodes further comprises:
   a node temperature sensor, configured to detect a partition temperature of a region in which each of the computing nodes is located, and transmit the partition temperature to the power management circuit;
   wherein when there is no central processing unit and the corresponding partition temperature is greater than a partition temperature threshold, the power management circuit switches each of the system fans in the corresponding node fan set to a third revolution rate, wherein the third revolution rate is greater than the first revolution rate.

5. The power management system according to claim 4, wherein the power management circuit continuously detects a current device temperature of each of the power consumption devices, detects a current power supply temperature and a current load of each of the power supply units, and determines whether each of the current device temperatures and each of the current power supply temperatures are respectively greater than corresponding thresholds; wherein
   when each of the current device temperatures, each of the current power supply temperatures, and each of the current loads are not greater than the corresponding thresholds, the power management circuit determines a total load of the system fans, so as to determine an enabled number and a revolution rate of system fans to be turned on; and
   when one of each of the current device temperatures, each of the current power supply temperatures, and each of the current loads is greater than a corresponding threshold, the power management circuit turns on all of the power supply units and the system fans.

6. The power management system according to claim 5, wherein the power consumption devices are classified into a first category and a second category by the power management circuit, the first category includes the power consumption devices that allow a relatively high operation temperature, and the second category includes the power consumption devices that allow a relative low operation temperature;
when there is the first category and there is no second category, and each of the current device temperatures in each of the power consumption devices in the first category is not greater than the corresponding threshold, the power management circuit switches the total load of the system fans to a first fan load; and
when there are both the first category and the second category, and each of the current device temperatures of each of the power consumption devices in the first category and the second category is not greater than the corresponding threshold, the power management circuit switches the total load of the system fans to a second fan load, wherein the second fan load is greater than the first fan load.

7. The power management system according to claim 1, wherein the power management circuit sets a plurality of temperature intervals and a plurality of load intervals;
wherein an intersection between each of the temperature intervals and one of the load intervals has a corresponding fan load; and
when a current power supply temperature of each of the power supply units is in each of the temperature intervals, the power management circuit obtains the corresponding fan load according to the intersection between the temperature interval and the load interval in which the current load is located, and switches a power supply fan of each of the power supply units.

8. A power management method configured to switch a plurality of power supply units between turn-on and turn-off, wherein the power supply units are configured to supply electricity power to a plurality of connection interfaces; wherein the connection interfaces are configured to be respectively connected to one of a plurality of power consumption devices; and the power management method comprises:
obtaining a current total load of the power supply units, and setting a target load of each of the power supply units;
detecting a connection status of each of the connection interfaces to determine, through a status signal returned by a designated pin in each of the connection interfaces, whether each of the connection interfaces is connected to one of the power consumption devices;
turning off power supply to the connection interface that is not connected to one of the power consumption devices;
determining an enabled number of the plurality of power supply units to be turned on according to the current total load and the target load of each of the power supply units; and
turning on or turning off each of the power supply units according to the enabled number of the plurality of power supply units to be turned on so that a current load of each of the power supply units to be turned on is close to the target load.

9. The power management method according to claim 8, further comprising:
providing a plurality of computing nodes, wherein each of the computing nodes is configured to be respectively provided with the power consumption devices, is provided with at least one of the power supply units and a node fan set, wherein each node fan set comprises a plurality of system fans; and
detecting whether there is a central processing unit in the power consumption devices of each of the computing nodes; when there is no central processing unit, switching each of the system fans in a corresponding node fan set to a first revolution rate or turning off each of the system fans; and
when there is the central processing unit, switching each of the system fans in the corresponding node fan set to a second revolution rate, wherein the second revolution rate is greater than the first revolution rate.

10. The power management method according to claim 9, further comprising:
detecting a partition temperature in a region in which each of the computing nodes is located; and
when there is no central processing unit, and the corresponding partition temperature is greater than a partition temperature threshold, switching each of the system fans in the corresponding node fan set to a third revolution rate, wherein the third revolution rate is greater than the first revolution rate.

11. The power management method according to claim 10, further comprising:
detecting a current device temperature of each of the power consumption devices, and detecting a current power supply temperature and a current load of each of the power supply units, and determining whether each of the current device temperatures and each of the current power supply temperatures are respectively greater than a corresponding threshold, wherein
when each of the current device temperatures, each of the current power supply temperatures, and each of the current loads are not greater than the corresponding thresholds, determining a total load of the system fans, so as to determine an enabled number and a revolution rate of system fans to be turned on; and
when one of each of the current device temperatures, each of the current power supply temperatures, and each of the current loads is greater than a corresponding threshold, turning on all of the power supply units and the system fans.

12. The power management method according to claim 11, further comprising classifying the power consumption devices into a first category and a second category, the first category includes the power consumption devices that allow a relatively high operation temperature, and the second category includes the power consumption devices that allow a relative low operation temperature; when there is the first category and there is no second category, and each of the current device temperatures in each of the power consumption devices in the first category is not greater than a corresponding threshold, switching the total load of the system fans to a first fan load; and
when there are both the first category and the second category, and each of the current device temperatures of each of the power consumption devices in the first category and the second category is not greater than the corresponding threshold, switching the total load of the system fans is to a second fan load, wherein the second fan load is greater than the first fan load.

13. The power management system according to claim 8, further comprising:

setting a plurality of temperature intervals and a plurality of load intervals; wherein an intersection between each of the temperature intervals and one of the load intervals has a corresponding fan load; and when a current power supply temperature of each of the power supply units is in each of the temperature intervals, obtaining the corresponding fan load according to the intersection between the temperature interval and the load interval in which the current load is located, to switch a power supply fan of each of the power supply units.

* * * * *